C. MACMILLAN.
CURRENT COLLECTING MEANS.
APPLICATION FILED FEB. 12, 1906.
901,976.
Patented Oct. 27, 1908.
2 SHEETS—SHEET 2.
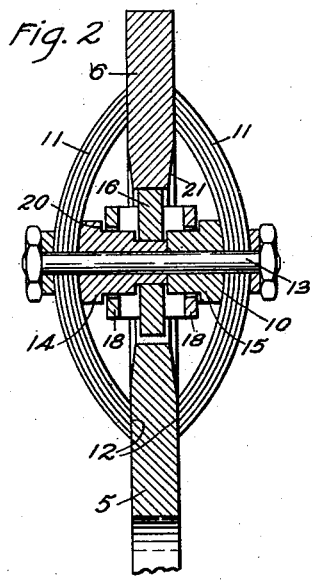
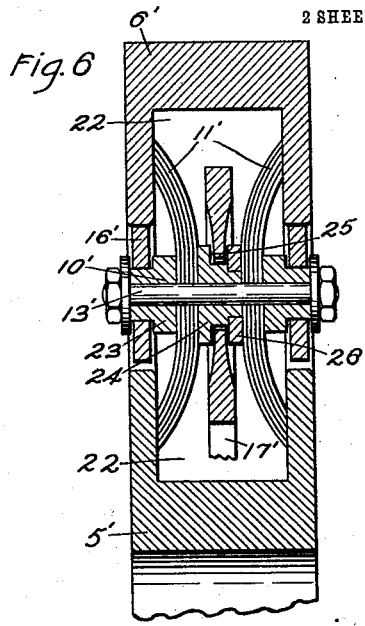
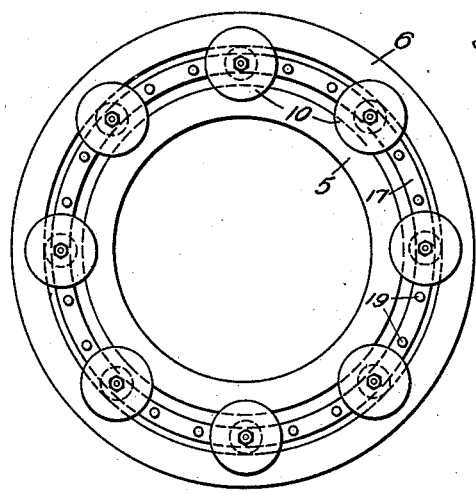
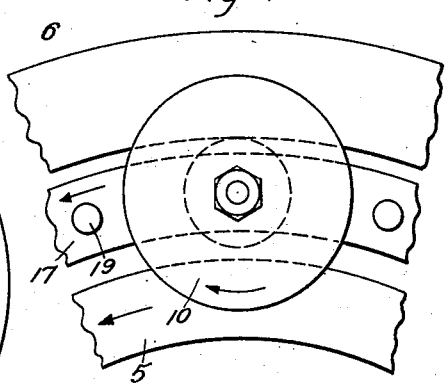
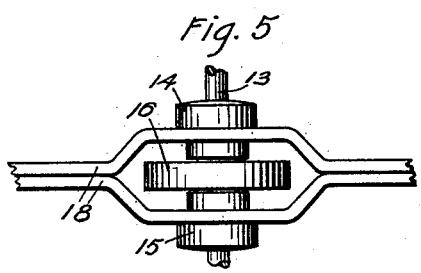
Witnesses:
Inventor:
Campbell Macmillan
By
Atty.

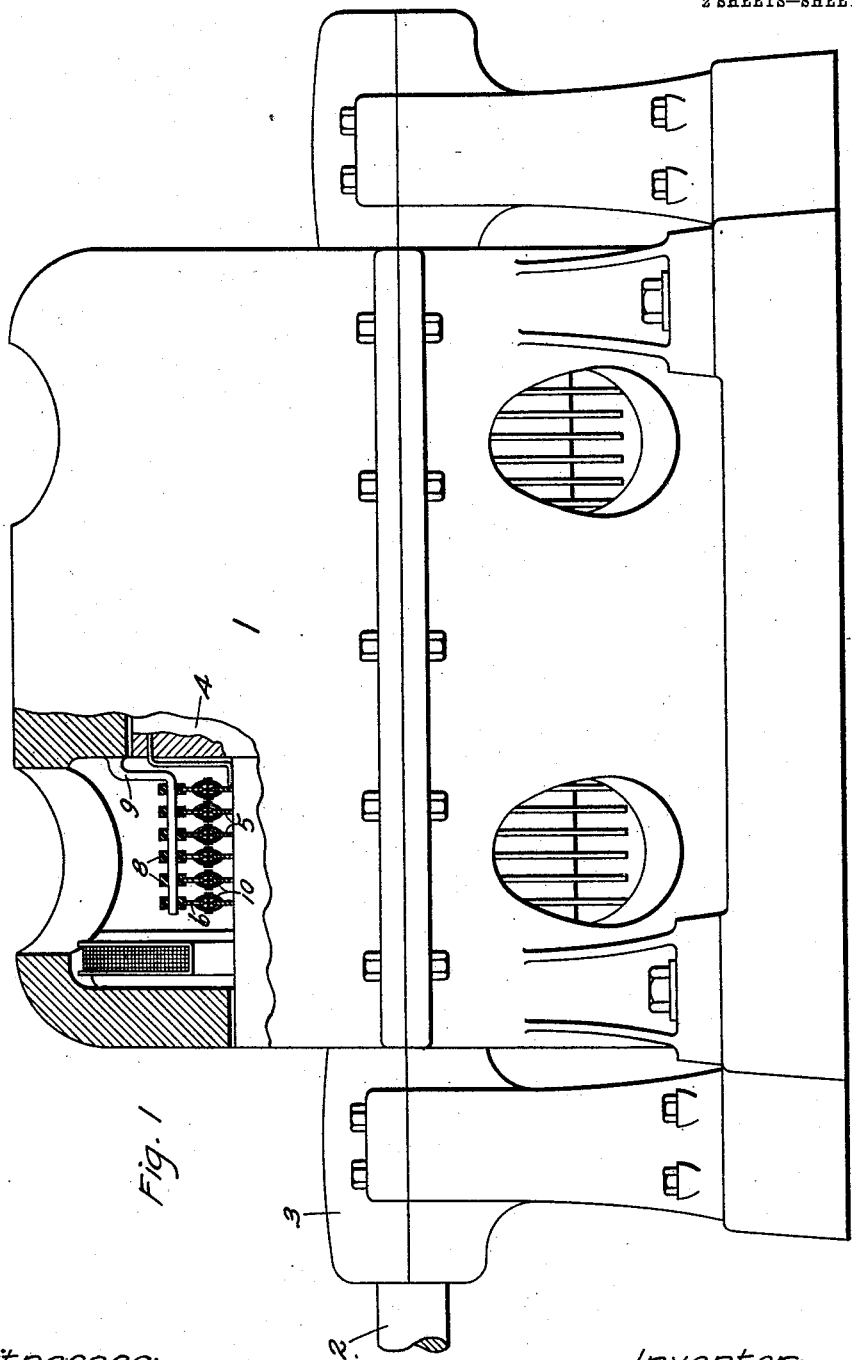

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

CURRENT-COLLECTING MEANS.

No. 901,976.  Specification of Letters Patent.  Patented Oct. 27, 1908.

Application filed February 12, 1906. Serial No. 300,579.

*To all whom it may concern:*

Be it known that I, CAMPBELL MACMILLAN, a subject of the King of Great Britain, residing at Schenectady, county of Schenectady, State of New York, have invented certain new and useful Improvements in Current-Collecting Means, of which the following is a specification.

My present invention relates to means for establishing electrical connections between stationary and movable electrical conductors, and is particularly designed for the purpose of making electrical connections with the collector rings of high-speed dynamo-electric machines.

In some dynamo-electric machines, such as the so-called unipolar generator, the means for making electrical connection with the movable element of a machine is the limiting feature in its design, since the difficulties in the way of establishing a satisfactory electrical connection with the collector ring, or the like, of the movable element of the machine has necessitated its operation at lower speeds than would otherwise have been used. All those skilled in the art understand that other things being equal, the higher the speed at which a dynamo-electric machine is operated, the more advantageous becomes its operation. Heretofore, it has been common in such a machine to employ as the means for making electrical connections with the moving element thereof, a collector ring carried by the movable element and one or more stationary coöperating contact devices, in the form of brushes usually made of copper in frictional engagement with the collector ring. In accordance with my present invention, however, I employ a contact device which is practically in rolling contact with the fixed and movable elements of the machine, thus doing away with nearly all of the frictional contact troubles heretofore experienced.

The various features of novelty which characterize my invention are pointed out with particularity in the claims annexed to and forming a part of this specification. For a better understanding of the nature and operation of my invention, however, reference may be had to the accompanying drawings and descriptive matter in which I have illustrated and described forms in which my invention may be embodied.

Of the drawings, Figure 1 is an elevation with parts broken away and in section of a high-speed unipolar generator; Fig. 2 is a sectional elevation of the movable and stationary collector rings and coöperating contact devices which may be employed therein; Fig. 3 is a semidiagrammatic representation of a pair of coöperating collector rings and contact members; Fig. 4 is a partial elevation taken at right angles to Fig. 2; Fig. 5 illustrates a detail of construction of the mechanism shown in Figs. 1 to 3, inclusive; and Fig. 6 is a sectional elevation taken similarly to Fig. 2 showing a modified construction.

Referring first to Figs. 1 to 4, inclusive, 1 designates a unipolar dynamo, the shaft 2 of the rotating element of which is journaled in suitable bearing boxes 3. Upon the shaft 2 is mounted a rotating element 4 of the machine which is provided with a series of collector rings 5 concentric with the shaft 1. These collector rings are usually, in a machine of the character described, made of a good quality of steel in order to withstand the strains due to centrifugal force and to diminish their wear produced by contact with the coöperating current-collecting devices.

Each of the collector rings 5 is encircled by a stationary collector ring 6 which may be made of brass supported through suitable insulating devices 8 by arms 9 extending from the frame of the machine. Connection is made between each collector ring 5 and the coöperating collector ring 6 by means of a series of rolling contact devices 10.

Referring to Figs. 2 to 5, inclusive, it will be observed that each rolling element comprises a pair of bridging devices 11, each consisting of a series of nested, dished disks of resilient conducting material, such as the alloy known as silicon copper. The edges 12 of the disks composing the two members 11 bear on the opposite sides of a pair of rings 5 and 6 with suitable pressure and are connected together by a bolt or rivet 13 which may be made of steel. The two members 11 forming a part of each element 10 are spaced apart by spacing members 14 and 15 which may be formed of brass, or the like. The members 14 and 15 surround the bolt or rivet 13. Each member 10 is provided with a roller 16 preferably formed of steel, which is journaled on a reduced portion of the spacing member 14 and bears against the inner surface of the appropriate ring 6. As shown, the members 10 connecting each coöperating pair of collector rings 5 and 6, are spaced apart by an annular member 17, which in the form shown, comprise two rings 18 of steel connected together by rivets 19. The rings 18 are spread apart at intervals to straddle the disks 16. The members 17 are prevented from axial displacement by their engagement with shoulders 20 formed for the purpose on the spacing members 14 and 15. As shown, the adjacent edges of the collector rings 5 and 6 may be beveled off at 21.

Referring to Fig. 4, it will be understood that when the collector ring 5 moves in the direction indicated by the arrow applied to it, each member 10 will rotate about its axis in the direction indicated by the small curved arrow marked thereon, and that the members 10 and 17 will move bodily in the direction indicated by the arrow on the member 17. Those skilled in the art will readily understand that the member 17 and the members 10 will move bodily with an angular velocity approximately half that of the angular velocity of the member 5 and also that the contact movement between each member 11 and the coöperating collector rings 5 and 6 will be practically a rolling movement, though there will however be some sliding movement between the members 11 and the coöperating collector rings due to breadth of the zone or annular portion of each member 11 which engages the contact members. The construction disclosed results in a sliding frictional relative movement between the parts, greatly reduced in quantity from that experienced in the constructions heretofore in use.

In the construction shown in Fig. 6, the rotating collector ring 5' and coöperating stationary member collector ring 6' have formed in their adjacent cylindrical surfaces annular grooves 22. The bridging members 11' of each rolling contact member 10' employed in this construction are assembled on a rivet or bolt 13' with their convex sides adjacent. Two roller members 16', employed to prevent radial displacement of each member 10', are located between the edges of the collector rings 5' and 6' at the sides of the slots or grooves 22, and are journaled on reduced portions of spacing members 23 carried by the bolt 13', one at the outer side of each member 11'. The various rolling members 10' connecting a pair of coöperating collector rings are spaced apart by a spacing member 17' journaled on the inner spacing member 24 located between each pair of bridge members 11'. Axial displacement of the member 17' is prevented by the shoulder 25 of the member 24 and a washer 26. The operation of this form of my invention is substantially the same as that of the form first described.

While the forms of my invention hereinbefore described and illustrated possess excellent properties, it will be understood that changes may be made in the form in which my invention is embodied without departing from its spirit, and I do not wish the claims hereinafter made to be limited to the particular embodiments disclosed more than is made necessary by the state of the art.

What I claim as new and desire to secure by Letters Patent of the United States, is—

1. In combination, a rotating collector ring, a stationary collector ring, a rotating contact member connecting them and engaging the sides of both rings, and means for supporting said contact member in operative relation to the rings.

2. In combination, a rotating shaft, a collector ring carried thereby, a coöperating stationary collector ring, a rolling contact device connecting the two rings and engaging the sides of both rings, and means for supporting said contact device in operative relation to said rings.

3. In combination, a rotating collector ring, a stationary collector ring, and a rotating contact member connecting them formed of a series of dished disks of conducting material nested in one another.

4. In combination, a collector ring rotating about its own axis, a stationary collector ring encircling the rotating ring, and a plurality of rotating contact members engaging the sides of both rings.

5. In combination, a collector ring rotating about its own axis, a stationary collector ring encircling the rotating ring, a plurality of rotating contact members engaging both rings, and a member for spacing said members apart.

6. In combination, a collector ring rotating about its own axis, a stationary collector ring encircling the rotating collector ring, and a rolling contact connecting the collector rings comprising a pair of dished disk-like members mechanically connected together with their edges bearing on opposite sides of said collector rings.

7. In combination, a pair of relatively movable ring-like conductors placed one within the other, and a contact member connecting them comprising a bridging member engaging one side of each ring and a coöperating bridging member engaging the opposite side of each ring, a connection between said bridging member, and a roller mounted thereon and bearing against a curved surface of one of said rings.

8. In a dynamo-electric machine, a pair of concentric circular conductors, one of said conductors being stationary and the other rotating about its own axis, and one or more contact members engaging the sides of said conductors, each of said contact members being in rolling contact with each of said conductors and free to rotate about its own axis, and also bodily about the axis of the rotating conductor.

9. In a dynamo-electric machine, a pair of concentric circular conductors relatively movable with respect to each other about their common axis, and one or more contact members engaging said conductors in planes at an angle to the axis, each of said contact members being free to rotate about its own axis, and also bodily about the axis of the conductors, said contact members being mechanically connected together.

In witness whereof, I have hereunto set my hand this 10th day of February, 1906.

CAMPBELL MACMILLAN.

Witnesses:
   BENJAMIN B. HULL,
   HELEN ORFORD.